United States Patent
Welsh

(10) Patent No.: US 8,454,315 B2
(45) Date of Patent: *Jun. 4, 2013

(54) ACTIVE FORCE GENERATION SYSTEM FOR MINIMIZING VIBRATION IN A ROTATING SYSTEM

(75) Inventor: William A. Welsh, New Haven, CT (US)

(73) Assignee: Sikorsky Aircraft Corporation, Stratford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 13/111,163

(22) Filed: May 19, 2011

(65) Prior Publication Data

US 2011/0217171 A1  Sep. 8, 2011

Related U.S. Application Data

(60) Continuation of application No. 12/352,676, filed on Jan. 13, 2009, now Pat. No. 8,021,115, which is a division of application No. 10/685,215, filed on Oct. 14, 2003.

(51) Int. Cl.
*B64C 27/51* (2006.01)

(52) U.S. Cl.
USPC ............................... 416/145; 416/500

(58) Field of Classification Search
USPC .................. 416/18, 106, 139, 140, 144, 145, 416/500
See application file for complete search history.

(56) References Cited

U.S. PATENT DOCUMENTS

| | | | |
|---|---|---|---|
| 3,830,109 A * | 8/1974 | Litvinovich et al. | 73/455 |
| 4,326,158 A | 4/1982 | Helgesen | |
| 5,553,514 A | 9/1996 | Walkowc | |
| 6,062,818 A | 5/2000 | Manfredotti et al. | |
| 6,813,973 B1 * | 11/2004 | Perry | 74/607 |
| 7,047,109 B2 | 5/2006 | Ogura et al. | |
| 8,021,115 B2 * | 9/2011 | Welsh | 416/145 |

FOREIGN PATENT DOCUMENTS

| | | |
|---|---|---|
| JP | 61164109 | 7/1986 |
| JP | 61164109 A * | 7/1986 |

* cited by examiner

*Primary Examiner* — Richard Edgar
(74) *Attorney, Agent, or Firm* — Carlson, Gaskey & Olds PC

(57) ABSTRACT

A method and device for reducing vibratory noise in a system with an integral rotating member includes independently operable drive systems for controlling the angular velocity of at least two independently rotatable masses. Control signals manipulate the drive system to rotate each mass at optimal speed, direction and phase to reduce noise induced in the system by the rotating member.

13 Claims, 4 Drawing Sheets

ACTIVE FORCE GENERATION SYSTEM FOR MINIMIZING VIBRATION IN A ROTATING SYSTEM

REFERENCE TO RELATED APPLICATIONS

The present invention is a Continuation of Divisional application Ser. No. 12/352,676, filed Jan. 13, 2009, now U.S. Pat. No. 8,021,115, which is a Divisional Application of U.S. patent application Ser. No. 10/685,215, filed Oct. 14, 2003.

BACKGROUND

This invention relates to vibration isolators, and more particularly, to an isolation system for minimizing in-plane vibrations produced in a rotating system of a rotary-wing aircraft, and still more particularly, to an isolation system that minimizes system weight, aerodynamic drag, and complexity while concomitantly providing active control and adjustment during operation for optimal efficacy across a wide spectrum of operating speeds.

Vibration isolation or absorption is oftentimes desirable for nulling or canceling vibrations associated with a rotating system. Such vibrations, when left unattenuated or unabated, may lead to structural fatigue and premature failure of system components. Furthermore, inasmuch as such vibrations may be transmitted through adjacent support structure to, for example, an aircraft avionics bay, areas occupied by passengers, or other components and cabin area remote from the source of the vibration which may also be subject to these same potentially damaging or disturbing vibrations (albeit perhaps lower in amplitude due to energy absorption by the interconnecting structure). Consequently, it is most desirable to isolate or absorb these vibrations at or near the source of the vibration in the rotating system.

One application which best exemplifies the need for and advantages derived from vibration isolation/absorption devices is the main torque driving hub of a helicopter rotor system. Typically, the main rotor of a helicopter, which comprises a central torque drive hub member for driving a plurality of lift producing rotor blades, is subject to a variety of aerodynamic and gyroscopic loads. For example, as each rotor blade advances or retreats relative to the freestream airflow, it experiences a sharp rise and fall of in-plane aerodynamic drag. Furthermore, as the tip of each rotor blade advances with each revolution of the rotor system, the relative velocity of the blade tip approaches supersonic Mach numbers. As such, large variations occur in the various coefficients which define blade performance (e.g., moment, lift and drag coefficients). Moreover, gyroscopic and Coriolis forces are generated causing the blades to "lead" or "lag" depending upon cyclic control inputs to the rotor system. All of the above generate substantial in-plane and out-of-plane vibrations which, if not suppressed, isolated or otherwise abated, are transmitted to the cockpit and cabin, typically through the mounting feet of the helicopter main rotor gearbox.

Various vibration isolation systems have been devised to counteract/oppose and minimize these in-plane and out-of-plane vibrations. Mast-mounted vibration isolators suppress or isolate in-plane vibrations at a location proximal to the source of such in-plane vibrations whereas transmission, cabin or cockpit absorbers dampen or absorb out-of-plane vibrations at a location remotely disposed from the source. Inasmuch as the present invention relates to the isolation of in-plane vibrations, only devices designed to counteract/oppose such vibrations will be discussed herein.

Some mast-mounted vibration isolators have a plurality of resilient arms (i.e., springs) extending in a spaced-apart spiral pattern between a hub attachment fitting and a ring-shaped inertial mass. Several pairs of spiral springs (i.e., four upper and four lower springs) are mounted to and equiangularly arranged with respect to both the hub attachment fitting and the inertial mass so as to produce substantially symmetric spring stiffness in an in-plane direction. The spring-mass system, i.e., spiral springs in combination with the ring-shaped mass, is tuned in the non-rotating system to a frequency equal to N * rotor RPM (e.g., 4P for a four-bladed rotor) at normal operating speed, so that in the rotating system it will respond to both N+1 and N−1 frequency vibrations (i.e., 3P and 5P for a four-bladed rotor). N is the number of rotor blades.

While these spiral spring arrangements produce a relatively small width dimension (i.e., the spiraling of the springs increases the effective spring rate), the height dimension of each vibration isolator is increased to react out-of-plane loads via the upper and lower pairs of spiral springs. This increased profile dimension increases the profile area, and consequently the profile drag produced by the isolator. The spiral springs must be manufactured to precise tolerances to obtain the relatively exact spring rates necessary for efficient operation such that manufacturing costs may be increased. Furthermore, these vibration isolators are passive devices which are tuned to a predetermined in-plane frequency. That is, the vibration isolators cannot be adjusted in-flight or during operation to isolate in-plane loads which may vary in frequency depending upon the specific operating regime.

Another general configuration of isolator known as a "bifilar" are mast-mounted vibration isolators having a hub attachment fitting connected to and driven by the helicopter rotorshaft, a plurality of radial arms projecting outwardly from the fitting and a mass coupled to the end of each arm via a rolling pin arrangement. That is, a pin rolls within a cycloidally shaped bushing thereby permitting edgewise motion of each mass relative to its respective arm. The geometry of the pin arrangement in combination with the centrifugal forces acting on the mass (imposed by rotation of the bifilar) results in an edgewise anti-vibration force at a 4 per revolution frequency which is out-of-phase with the large 4 per revolution (or "4P" as it is commonly referred to as helicopter art) in-plane vibrations of the rotor hub for a 4 bladed helicopter. The frequency of 4P is the frequency as observed in a non-rotating reference system.

More specifically, pairs of opposed masses act in unison to produce forces which counteract forces active on the rotor hub. In FIG. 1, a schematic of a pair of bifilar masses, at one instant in time, are depicted to illustrate the physics of the device. Therein, the masses MI, MII are disposed at their extreme edgewise position within each of the respective cycloidal bushings BI, BII. The masses MI, MII produce maximum force vectors F/2, which produce a resultant vector F at the center, and coincident with the rotational axis, of the rotating system. The combined or resultant force vector F is equal and opposite to the maximum vibratory load vector P active on the rotor at the same instant of time. This condition, when the bifilar produces an equal and opposite force F that opposes the rotor load P, reflects ideal operation of the bifilar. Excessive bifilar damping or manufacturing imperfections will cause the bifilar output force F to differ from the disturbing force P produced by the rotor either in magnitude or phase best suited to nullify the rotor loads. This condition may cause unwanted fuselage vibration. It will also be appreciated that for the masses to produce the necessary shear forces to react the in-plane vibratory loads of the rotor system, counteracting bending moments are also produced. These force couples impose large edgewise bending loads in the radial arms, and, consequently, the geometry thereof must produce the necessary stiffness (EI) at the root end of the arms. As such, these increased stiffness requirements require the relatively large and heavy bifilar arms.

While the bifilar system has proven effective and reliable, the weight of the system, nearly 210 lbs, is detrimental to the overall lifting capacity of the helicopter. To appreciate the significance of the increased weight, it has been estimated that for each pound of additional weight, direct operating cost of the helicopter may increase by approximately $10,000.

Furthermore, the pin mount for coupling each mass to its respective radial arm routinely and regularly wear, thus requiring frequent removal and replacement of the cyclical bushings. This increases the Direct Maintenance Costs (DMC) for operating the helicopter, which contributes, to the fiscal burdens of the bifilar system and the helicopter.

Therefore, a need exists for an isolation system to reduce vibrations in a rotating system that isolates a wide spectrum of vibratory loads; especially large amplitude loads, minimizes system weight, reduces aerodynamic drag and reduces DMC.

SUMMARY

The present invention provides a vibration isolation system which is controllable for varying the range of isolation frequencies which absorbs large amplitude vibrations while minimizing system weight.

The vibration isolation system employs readily manufactured components which is insensitive to damping and manufacturing imperfections.

BRIEF DESCRIPTION OF THE DRAWINGS

A more complete understanding of the present invention and the attendant features and advantages thereof may be had by reference to the following detailed description when considered in conjunction with the accompanying drawings wherein.

DETAILED DESCRIPTION

The isolation system of the present invention is described in the context of a helicopter rotor system, such as that employed in an Army BLACK HAWK helicopter produced by Sikorsky Aircraft Corporation. One skilled in the art, however, will appreciate that the present invention has utility in any rotating system which produces vibratory loads (noise). The invention is especially useful in rotating systems that produce large vibratory loads that vary depending upon different operating regimes or variable operating speeds.

Figure 1:
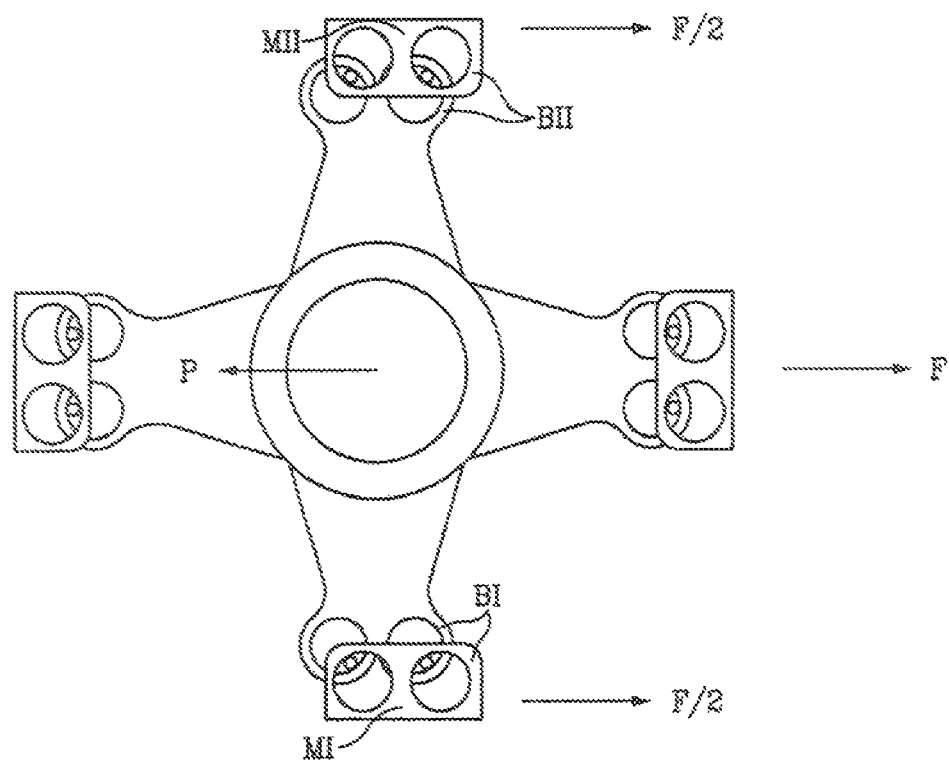
FIG. 1 is a schematic of a prior art bifilar isolation device for illustrating certain physical characteristics thereof.
Figure 2:
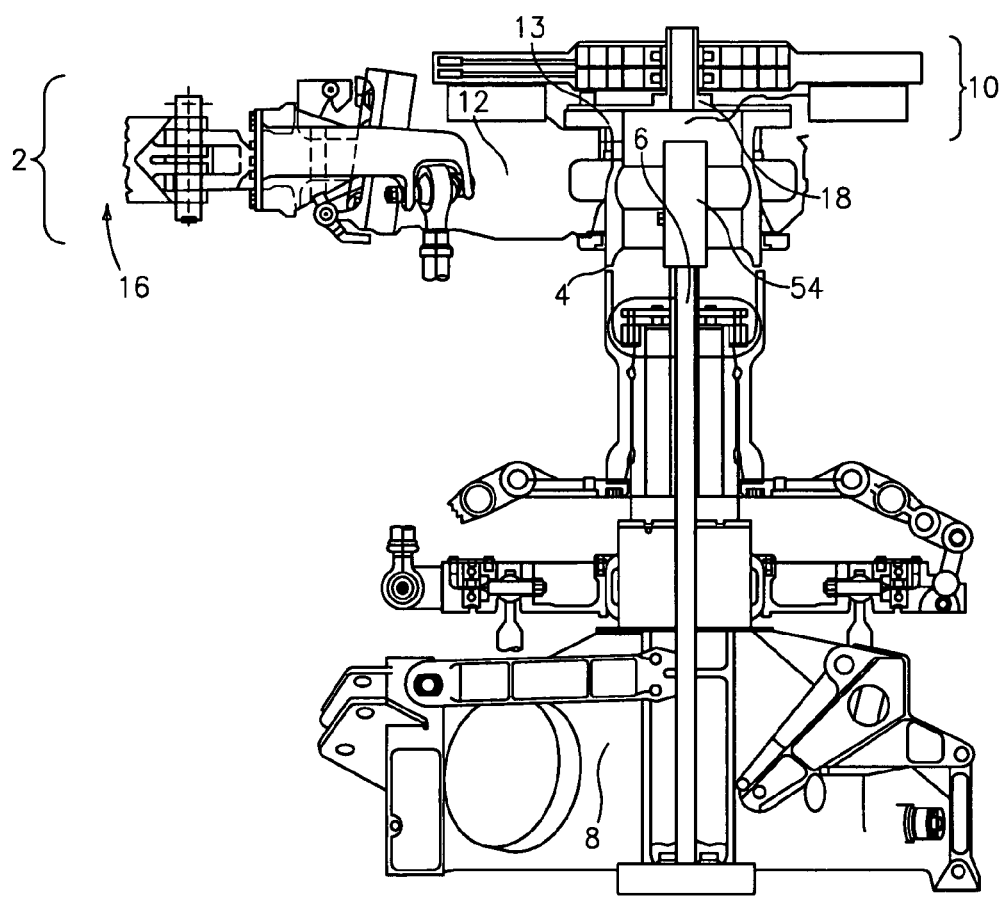
FIG. 2 is a side sectional view of a helicopter main rotor, including a main rotor shaft having an isolation system according to the present invention mounted to the upper mast or shaft extension member of the rotor.

Referring to FIG. 2, the vibration isolation system 10 is disposed in combination with a rotary-wing aircraft main rotor system 2 having a main rotor shaft 4 (rotating system member) that is driven about a rotational axis 6 by a torque driving transmission 8. In the described embodiment, the rotor system 2 includes a hub 12 having four radial arms that mount to and drive each rotor blade 16. The vibration isolation system 10 is mounted to a flanged end 13 of the main rotor shaft 4 through a hub attachment fitting 18. Vibratory forces active on the main rotor system 2 are generated by a variety of factors, although the dominant vibrations originate from aerodynamic and/or gyroscopic forces generated by each rotor blade 16. A four bladed rotor system produces 3P vibratory loads, i.e., in a single revolution, the magnitude of the load vector varies from a minimum to a maximum value three times in the rotating frame of reference. This resolves into 4P vibration in the non-rotating frame of reference due to the addition of the 1P rotor rotational speed. While a variety of factors influence the vibratory spectrum of a rotor system, such 4P vibrations are generally a result of each rotor blade experiencing maximum lift when advancing and minimum lift when retreating.

Figure 4:
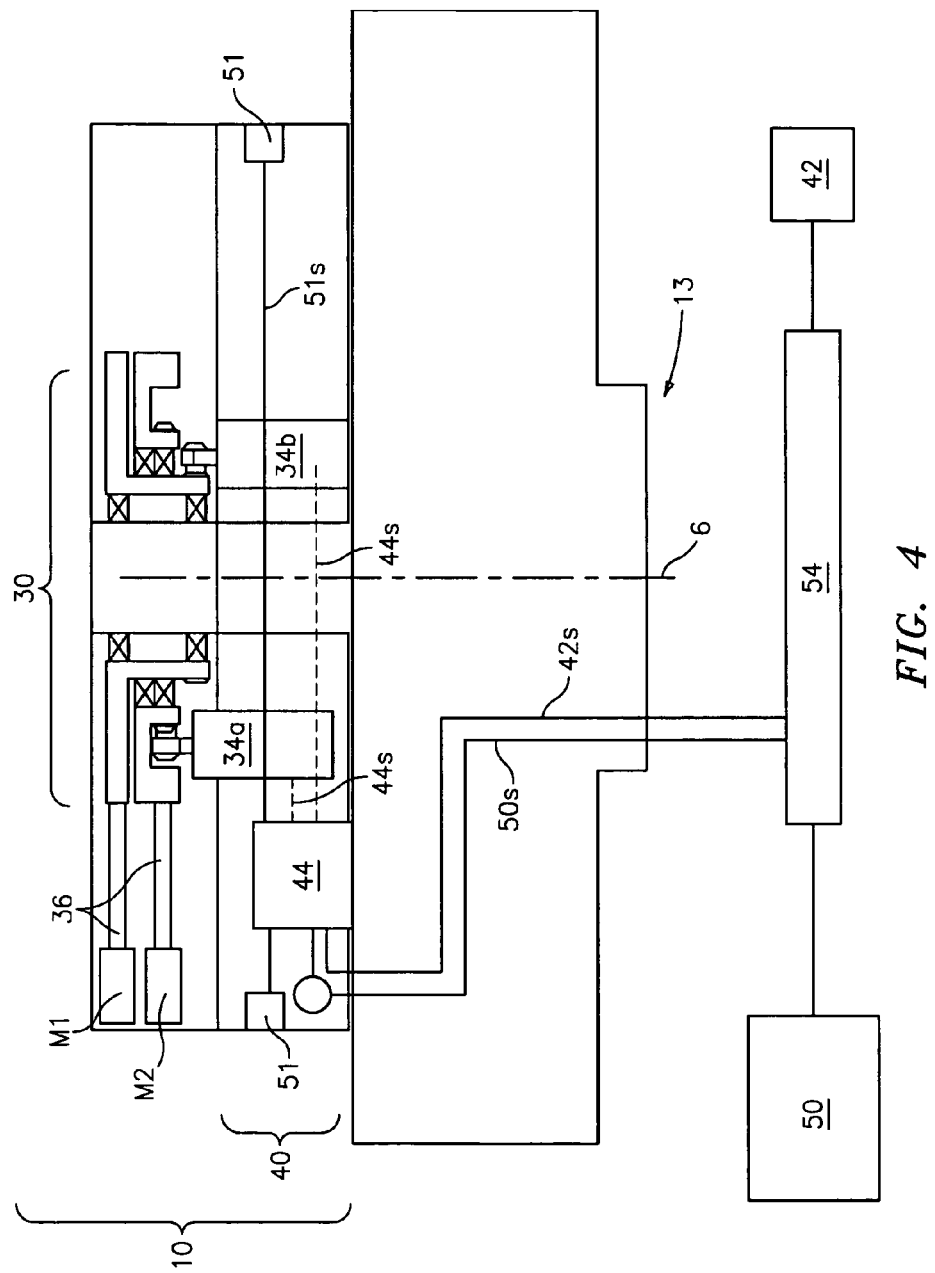
FIG. 4 is a side sectional view of one embodiment of the isolation device.

Referring to FIGS. 2 and 4, the vibration isolation system 10 includes two, essentially coplanar, masses M1, M2, a drive system 30 for driving the masses M1, M2 about the rotational axis 6 of the main rotor shaft 4, a control system 40 for issuing control signals to the drive system 30 to control the rotational speed and relative angular position of the masses M1, M2 and a power source 50 for energizing the drive system 30 and control system 40.

The masses M1, M2 are (i) disposed at a predetermined distance R from the main rotor shaft axis 6; (ii) driven in the same or opposing rotational direction as the main rotor shaft axis 6; and (iii) driven at a rotational speed at least 3P greater than the rotational speed 1P of the rotor shaft 4. In one embodiment, the drive system 30 includes a pair of electric motors 34a, 34b for driving each of the masses M1, M2 through a relatively small diameter, constant cross-section radial arm 36 (shown schematically in FIG. 3a-3c). Moreover, the electric motors 34a, 34b are independent of each other, e.g., may be driven at different rotational speeds to enable variation of the isolation force magnitude and phase.

As shown in FIG. 4, the control system 40 requires a speed sensor 42 for issuing signals 42s indicative of the rotational speed 1P of the rotor shaft 4, and a signal processing and amplifier 44, responsive to the speed signals 42s, to issue control signals 44s to the drive system 30 indicative of the rotational velocity and relative angular position of each of the masses M1, M2. While the speed sensor 42 may be a dedicated unit for sensing rotor speed, the same information may be obtained from a transmission alternator or generator 50 which turns at a predefined speed multiple relative to the rotor speed. The alternator or generator 50 supplies power to the controller-amplifier 44 through the slip ring 54. Hence, the control system 40 may use voltage phase information from such devices to issue the appropriate control signals to the drive system 30.

While the isolation system 10 may employ a control system 40 having a predefined schedule or model of the vibrations, e.g., at prescribed rotor speeds, another embodiment may also employ a vibration sensing device or system. As such, the control system 40 includes one or more vibration feedback sensors 51 for issuing vibration signals 51s indicative of the vibrations (e.g., amplitude, frequency and phase) of the helicopter rotor hub 12. The control system 40, therefore, samples vibration levels at predefined intervals or rates to identify a trend-positive (lower vibration levels) or negative (larger vibration levels). Accordingly, as vibration levels change, the control system 40 issues modified signals 44s to the drive system 30 until an optimum combination of rotational speed, force magnitude and phase are achieved.

The isolation system 10 may be powered by any of a variety of known methods, especially methods which may require transmission from a stationary to a rotating reference field. In the described embodiment shown in FIG. 4 the drive system 30 and control system 40, respectively, are powered by a 15 kVa generator 50 which provides a 115 volt potential at 400 Hz and with 3 phases (typical AC power for helicopters). Power is transferred from the stationary system to the rotating system via a conventional cylindrical slip ring 54. Only a small amount of additional weight is required inasmuch as the slip ring 54 is pre-existing and used for powering other systems e.g., rotor blade de-ice system. This slip ring may also be used to communicate the control signals 42s to the drive system 30 when the control system 40 is mounted in the fuselage rather than on the rotor system 2.

In operation, the masses M1, M2 (shown in FIGS. 3a-3c) are driven by the drive system 30 at a rotational speed greater than the rotational speed of the rotating system and appropriately positioned to yield a load vector P10 which is equal and opposite to the load vector P2 produced by the rotor system 2. This counteracting load vector P10 can be viewed as a vector which attempts to cancel or null the displacement of the rotor shaft 4. In the described embodiment, the masses turn at a rotational speed.

Inasmuch as the drive system 30 is mounted directly to the rotating shaft 4 of the rotor system 2, the drive system 30 need only drive the masses M1, M2 three additional revolution per cycle (for each revolution of the rotor system) to achieve the desired 4P frequency. That is, since the masses M1, M2 are, in a rotating reference system, driven at one revolution per cycle by the rotor system 2 itself, the drive means 30 need only augment the rotational speed by the difference (4P−1P) to achieve the necessary 4P in the stationary reference system.

Figure 3A:
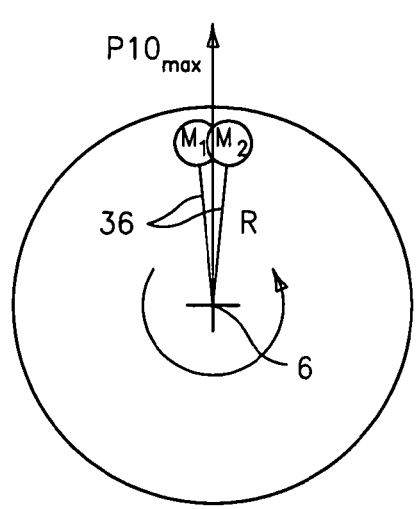
FIGS. 3a-3c depict schematic views of various operating conditions of the inventive isolation system.
Figure 3B:
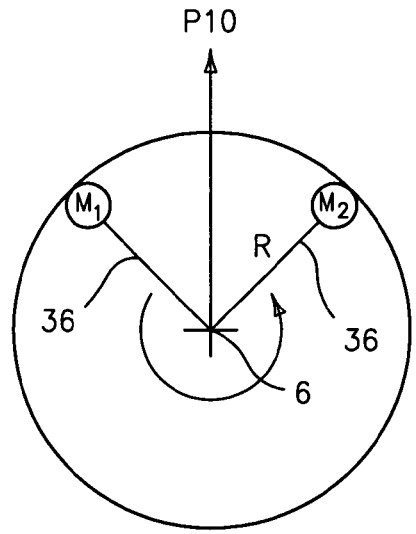
Figure 3C:
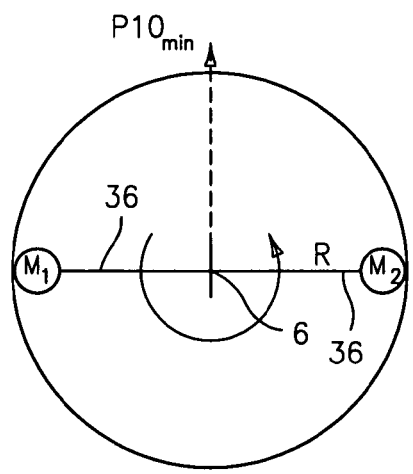

FIGS. 3a-3c depict various operating positions of the masses M1, M2 to emphasize the function and versatility of the isolation system 10.

In FIG. 3a, the masses M1, M2 are essentially coincident and act in unison to produce a maximum force vector P10MAX.

In FIG. 3b, the masses M1, M2 define a right angle (90 degrees) therebetween thereby producing a force vector P10MAX/(sqrt (2)) that is a fraction of the magnitude of the maximum force vector.

In FIG. 3c, the masses M1, M2 define a straight angle (180 degrees) and are essentially opposing to cancel the vectors produced by each of the masses M1, M2 independently or individually.

In FIG. 4, the controller 40 issues signals to the drive system 30 to (a) drive the masses M1, M2 at a rotational speed greater than that of the rotating system and (b) produce a counteracting load of the correct magnitude and phase to efficiently isolate vibrations.

The ability to independently vary the relative angular position of the masses M1, M2 is especially valuable in applications wherein the magnitude of the vibratory load active in/on the rotating system varies as a function of operating regime or operating speed. In a rotary-wing aircraft, for example, it is common to require the highest levels of vibration isolation in high speed forward flight i.e., where the rotor blades are experiencing the largest differential in aerodynamic loading from advancing to retreating sides of the rotor system. Consequently, it may be expected that the drive system 30 produce the maximum load vector P10MAX such as illustrated in FIG. 3a. In yet another example, it is anticipated that the lowest levels of vibration isolation would occur in a loiter or hovering operating mode, where the rotor blades are exposed to the generally equivalent aerodynamic and gyroscopic affects. Consequently, it may be expected that the drive means 30 produce no or a minimum load vector P10MIN such as illustrated in FIG. 3c.

Thus far, the discussion herein has concentrated on the rotational speed and angular position of the masses M1, M2 to produce vibration isolation. While this feature of the invention is a primary aspect of the invention, the configuration of the inventive isolation system 10 produces counteracting load vectors P10 which act though the rotational axis of the rotor shaft 4. That is, the line of action of the load vector P10, whether the masses M1, M2 are coincident or opposing, intersects the rotational axis and produces pure radial loads. As such, the radial arms of the isolation system 10 are principally loaded in tension rather than a combination of tensile and bending moment loads. A consequence of this loading condition is a reduction in system weight inasmuch as the radial arms 36 need not produce high edgewise strength to react bending moment loads.

Furthermore, tensile loading in the radial arms 36 enables the use of a constant-cross-section structure to react the centrifugal loads produced by each of the masses M1, M2. Moreover, directional strength materials (non-isotropic) may be employed such as unidirectional fiber reinforced composites. As a result, the isolation device may be produced using relatively low cost manufacturing techniques and materials. For example, cylindrical raw material stock, cut to the proper length, may be employed without secondary processing. Also, the use of unidirectional composites enables yet further weight reduction.

Although the invention has been shown and described herein with respect to a certain detailed embodiment of a mast-mounted helicopter isolator, it will be understood by those skilled in the art that a variety of modifications and variations are possible in light of the above teachings. It is therefore to be understood that, within the scope of the appended claims, the present invention may be practiced otherwise than as specifically described hereinabove.

What is claimed is:

1. A rotary-wing aircraft rotor system which rotates about an axis of rotation, comprising:
    a rotor system having an N number of blades which rotates about an axis of rotation at a rotational speed of 1P such that said main rotor system produces NP vibrations;
    a sensor system which senses the NP vibrations;
    a multiple of masses coaxially disposed with said rotor system, said multiple of masses includes a first mass and a second mass;
    a first drive system to spin said first mass about said axis of rotation at a first angular velocity different than an angular velocity of said rotor system;
    a second drive system to spin said second mass about said axis of rotation at a second angular velocity different than said angular velocity of said rotor system; and
    a control system in communication with said sensor system and said drive system, said control system operable to identify variations of the NP vibrations to control the angular velocity of at least one of said multiple of masses to reduce the NP in-plane vibrations.

2. The system as recited in claim 1, wherein each of the multiple of masses are within a separate plane.

3. The system as recited in claim 1, wherein said drive system rotates at least one of said multiple of masses in a direction opposite to the rotational direction of said rotor system.

4. The system as recited in claim 1, wherein said multiple of masses spin continuously while said multiple of masses reduce the NP vibrations.

5. The system as recited in claim 1, wherein said control system utilizes a phase angle from a power source driven by said main rotor system as a phase angle reference to said control system.

6. The system as recited in claim 5, wherein said sensor system is interconnected to said main rotor system to provide feedback signals to said control system.

7. The system as recited in claim 1, wherein each of said multiple of masses includes an eccentric mass defined relative to said axis of rotation.

8. A rotary-wing aircraft rotor system which rotates about an axis of rotation, comprising:
   a rotor system having an N number of blades which rotates about an axis of rotation at a rotational speed of 1P, such that said main rotor system produces NP vibrations;
   a sensor system which senses the NP vibrations;
   a multiple of masses coaxially disposed with said rotor system;
   a drive system to independently spin each of said multiple of masses about said axis of rotation at an angular velocity different than an angular velocity of said rotor system, wherein said drive system is configured to drive each of said multiple of masses at an independent angular velocity; and
   a control system in communication with said sensor system and said drive system, said control system operable to identify variations of the NP vibrations to control the angular velocity of at least one of said multiple of masses to reduce the NP vibrations.

9. The system as recited in claim 8, wherein said rotor system includes a rotary wing aircraft main rotor system.

10. The system as recited in claim 8, wherein said drive system rotates at least one of said multiple of masses in a direction opposite to the rotational direction of said rotor system.

11. The system as recited in claim 8, wherein said drive system rotates at least one of said multiple of masses at an angular velocity greater than an angular velocity of said rotor system.

12. The system as recited in claim 8, wherein said control system utilizes a phase angle from a power source driven by said main rotor system as a phase angle reference to said control system.

13. The system as recited in claim 12, wherein said control system communicates with said sensor system to provide feedback signals of said NP vibrations to said control system.

* * * * *